Dec. 30, 1969  D. M. BEERY  3,486,438
MANUFACTURE OF LAMINATES
Original Filed Nov. 28, 1960  2 Sheets-Sheet 1
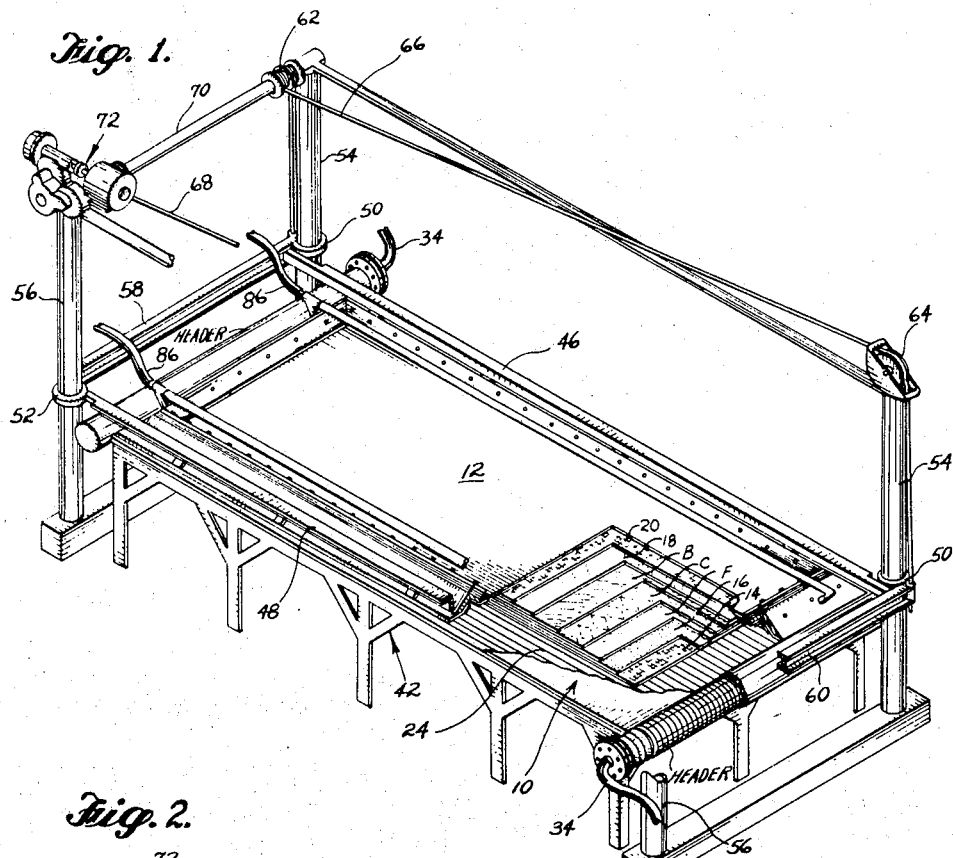
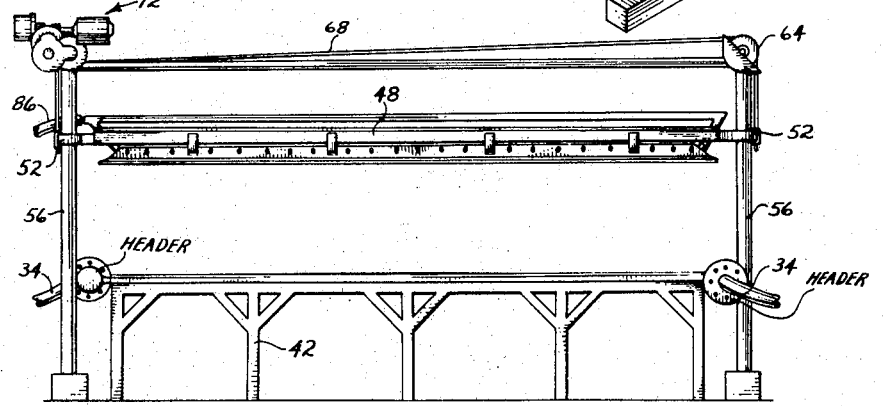
INVENTOR.
DALE M. BEERY
BY
Christensen Sanborn
and Matthews Dec. 30, 1969  D. M. BEERY  3,486,438
MANUFACTURE OF LAMINATES
Original Filed Nov. 28, 1960  2 Sheets-Sheet 2
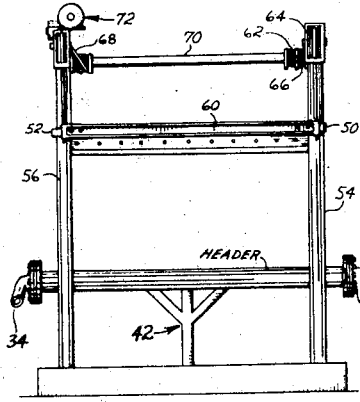
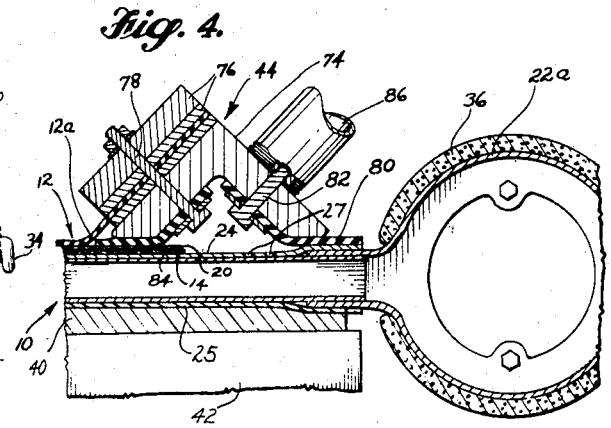
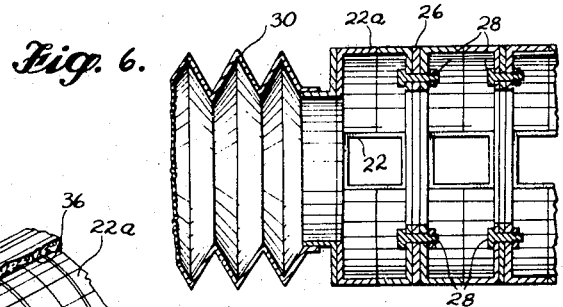
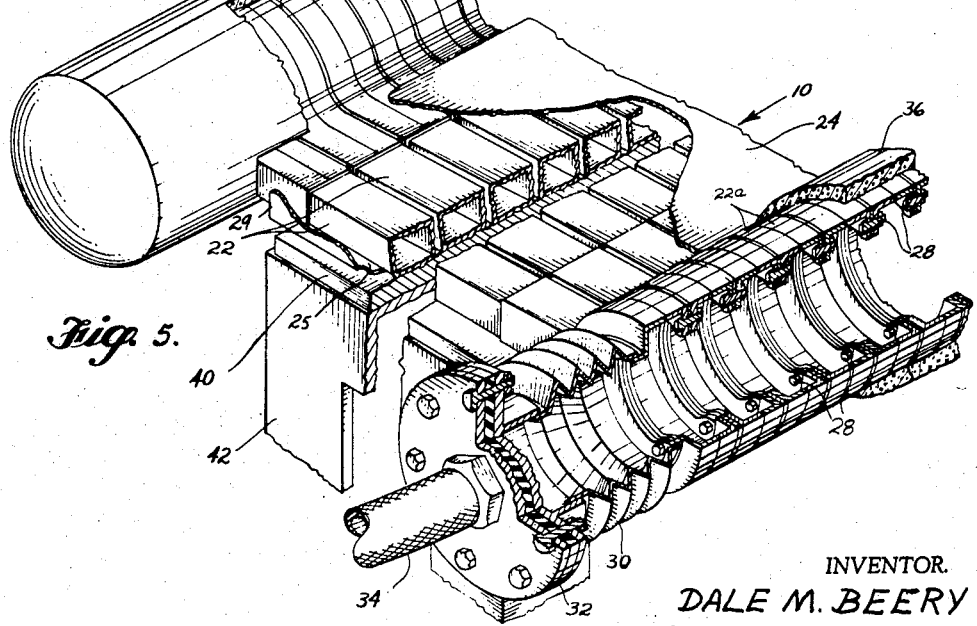
INVENTOR.
DALE M. BEERY
BY
Christensen Sanborn
and Matthews

United States Patent Office 3,486,438
Patented Dec. 30, 1969

3,486,438
MANUFACTURE OF LAMINATES
Dale M. Beery, Seattle, Wash., assignor to Boeing Airplane Company, Seattle, Wash., a corporation of Delaware
Original application Nov. 28, 1960, Ser. No. 72,094. Divided and this application Nov. 2, 1966, Ser. No. 644,406
Int. Cl. B30b *15/34;* B29g *1/00*
U.S. Cl. 100—93          5 Claims This is a division of application Ser. No. 72,094, filed Nov. 28, 1960, now abandoned.

This invention relates to improved apparatus for manufacturing laminar products and more particularly concerns the manufacture of decorative thermoplastic laminar sheets such as clear vinyl-faced rigid sheets having decorative core layers. The invention is herein illustratively described by reference to the preferred mode of practicing the same; however, it will be recognized that certain modifications and changes therein with respect to details may be made without departing from the underlying and essential features involved.

Light-weight attractive wall structures have been developed, for airplane cabin interiors and the like, featuring rigid (i.e., non-pliable) decorative laminate sheets stiffened by honecomb reinforcing bonded to the back sides thereof. These sheets desirably consist of an opaque plastic (usually white vinyl) backing layer, a clear plastic (again preferably vinyl, either uncolored or tinted) face layer and a decorative core layer fused by heat and pressure to the face and backing layers. The face layer may be smooth, or given an embossed or matte finish. The backing layer is usually opaque and may be white or otherwise colored to impart desired lighting effects. In a practical case these laminates are about ½₂ of an inch thick but may vary according to preference or design requirements. Typically polyvinyl chloride or similar thermoplastic face and backing layers protectively cover a decorative paper, foil, fabric, film or fiber core layer to which they are fused or bonded under pressure and heat of activation. Such laminates are noninflammable, stain resistant, easily cleaned and durably attractive and wear resistant. They may be used not only for wall surfacing, but also for screens, for counter top or cabinet coverings, and in various other applications.

In the manufacture of panels of this general type by conventional, apparatus thermal fusion or bonding of the laminae to produce an acceptably uniform product requires the application of great pressure to the assembled layers. Commonly pressures exceeding 700 pounds per square inch are used. Such high pressures were necessary in order to eliminate condensable and uncondensable vapors and gases resulting from or representing moisture in the core material, entrapped air, decomposition of the polyvinyl chloride or other surface into hydrogen chloride gas or other gases, and decomposition of sizing compounds, such as starch, in the core layer. Sometimes gases and vapors were not completely eliminated despite the high pressures employed and rejects were not uncommon. Sometimes gases went into solution in the vinyl materials with deleterious effects. Also, at these high pressures press construction was necessarily massive and expensive and it was not practical to manufacture sheets of large size. The difficulty lay partly in the problem of maintaining uniform spacing between press platens throughout the entire area of a sheet because of platen deflection under the heavy forces applied, and partly in the problem of entirely eliminating vapors and gases due to the increased distances of travel in order to escape from between the laminations in the case of a large sheet. Furthermore, in such massive structures heat-up and cool-down time was correspondingly increased and production rates were retarded due to the necessity of initially heating the assembly and then cooling the laminate while still under pressure so as to prevent delamination or appearance of bubbles therein when released from the press.

The present invention is directed to a simplified and vacuum press economical for manufacturing these and similar laminar products. A further object hereof is to devise a rapid-production vacuum press for this general purpose which permits manufacture of large sheets with practically the same ease and speed, and without any apparatus penalty, as that permitted for small sheets. As a practical matter, the invention makes possible manufacture of substantially larger sheets than was heretofore economically feasible or practical and at much lower cost and substantially higher rates of production, with fewer rejects and with greater versatility in terms of the types of decorative effects that may be achieved and the range of materials that may be used for the layers.

In the apparatus of this invention pressing of the laminar assembly is done by creating a partial vacuum in the space between a rigid heat-exchange press platen and an opposing flexible sealing cover platen which yields to atmospheric pressure and thereby compresses the laminae against the rigid platen.

Features of the invention reside in the novel construction of the rapid cycling heated press platen. In the past, efforts to decrease the heat-up and cool-off time of presses by connecting thin-walled platen tubes or sections between and headers have created excessive differential thermal expansion and contraction stresses between these parts. Stress isolating couplings were tried to eliminate these stresses but these proved to be unduly expensive and complex. Accordingly features of this invention reside in a rigid platen device comprising a plurality of thin walled metal heat exchange tubes which are arranged in spaced parallel series relationship, and disposed within a vacuum envelope. A flat thermally conductive metal sheet is placed in unbonded contact with the series of tubes on one face thereof, and means are joined with the metal sheet to form, in conjunction therewith, a vacuum envelope surrounding the series of tubes. Negative pressure is applied to the envelope to draw the sheet firmly into heat exchange contact with the tubes, and heat exchange fluid is passed through the tubes to change the temperature thereof. In addition, a lubricant may be interposed between the sheet and the adjacent tube surfaces to facilitate relative sliding therebetween under differential thermal expansion of the sheet and tubes.

The opposing or flexible platen comprises a rubber or rubber-like diaphragm set in a frame which extends around its perimeter, and is mounted to be raised and lowered in relation to the rigid platen device against which it comes into vacuum-sealing contact for pressing operations. The frame comprises an open channel having a compressible elastic bead extending along its outer edge which sealingly contacts the rigid platen. Air and escaping gas and vapors are drawn through this channel into the vacuum system during pressing operations.

These and other features, objects and advantages of the invention will become more fully evident from the following description thereof by reference to the accompanying drawings.

FIGURE 1 is a perspective view with parts broken away showing a typical press embodying certain apparatus features of the invention.

FIGURE 2 is a side elevation view, and FIGURE 3 an end elevation view of the press.

FIGURE 4 is an enlarged sectional detail showing certain preferred features of the platen construction.

FIGURE 5 is a perspective view with parts broken away showing other details of construction of the heated platen.

FIGURE 6 is a fragmentary sectional detail taken on the axis of one header of the platen shown in FIGURE 10.

Referring to FIGURE 1, the lower, rigid heat-exchange press platen is designated 10 and the upper, flexible membrane cover platen 12. In the first step of a representative method of utilizing the press a coarse bleeder cloth sheet 14, such as a layer of Osnaberg cloth, a porous fabric resembling burlap, is placed directly on the platen 10 and is covered by a porous metal caul sheet 16, such as a flame-sprayed aluminum particle sheet. The clear polyvinyl chloride face layer F is deposited on the caul 16, followed by the permeable decorative core layer C, the opaque plastic backing layer B, a parting film 18, such as a thin sheet of polyvinyl alcohol material, and finally a coarse fabric sheet material 20, such as one or two layers of Osnaberg cloth, the various layers and sheets being arranged in superposed registry. The core layer C preferably extends outwardly beyond the edges of the immediately adjoining face and backing layers F and B to prevent entrapment of gases and vapors between these outer layers.

With the layers assembled on the stationary lower platen, the next step is to lower the cover platen 12 to form an enclosure containing the laminae and apply vacuum-inducing negative pressure to the enclosed space. As the partial vacuum develops, it permits a substantial atmospheric pressure to act downwardly on the flexible cover platen and thereby compress the laminae, as illustrated. With the laminae thus compressed the layers are heated quickly to the required temperature for activating the polyvinyl chloride material in order to fuse together the layers B, C and F. Such heating is accomplished in the example by passing superheated steam or other heating fluid through the tubular passageways formed in the base platen 10.

When the laminating layers B, C and F are suitably heated and fused together, the next step is to cool the laminar product so as to set the thermally activated plastic substance before the vacuum is removed and the lamine are released from the applied compressive force. Cooling is accomplished by passing cooling fluid through the tubular passages in the platen 10. Finally, the upper platen 12 is lifted and the completed laminate F, C, B is removed from the press for any necessary trimming of edges. At that time the parting film 18 is peeled from the backing layer F should there be any slight tendency for it to stick to the layer F. The already-cooled press is then ready for a succeeding similar laminating operation.

In a practical and successful press already operating, the rigid platen 10 is approximately seven feet by thirteen feet. There is no reason why it may not be even larger, or of course smaller, if desired. This platen is made up in the example by approximately 148 elongated rectangular thin-wall stainless steel tubes 22 disposed in parallel coplanar relationship with a slight spacing (i.e., one-fourth inch) between them. The top side of the series of tubes is covered by a thin flat aluminum sheet 24 which is not bonded to the tubes but is merely laid in place and is free to slide in relation to the tube surfaces. A second thin flat aluminum sheet 25 is similarly placed in unbonded contact with the lower side of the series of tubes 22. By suitable means such as apertures 27 provided in the upper sheet in the area thereof covered by the marginal vacuum channel 44 to be described the space between the sheets 24 and 25, occupied by the tubes 22, is evacuated during operation of the press. By so evacuating this space, the sheet 24 is drawn into uniform contact with the stainless steel tubes for purposes of maximum heat transfer rate between the tubes and the work lying on the sheet 24. With a platen thirteen feet long and with stainless steel tubes and the aluminum sheets 24 and 25, there will be as much as three-fourths of an inch difference between the thermal expansion of the tubes and sheet when temperature changes between its operating limits. Since the tubes are not bonded to the sheets, however, this differential temperature expansion and contraction is accommodated without stresses developing between the platen components. On the other hand, if the sheets were bonded to the tubes, the resulting stresses would cause severe buckling of the platen. Buckling in such a case could be prevented only by a more rigid and massive construction which in turn would defeat the objective of a platen having low heat storage capacity in order to achieve a rapid cycling press. The vacuum envelope for the tubes 22 is completed by narrow sheets 29 which interconnect sheets 24 and 25 at the sides of the platen. In fact, to further the objective of a nonbuckling light-weight platen it is desirable to use a lubricant such as molybdenum disulfide between the surfaces of the sheets 24 and 25 and the tubes 22.

As to further features of the press platen construction, each tube terminates at each end in a hollow annular collar 22a of similar thin-walled sheet material formed in halves silver-brazed together and to the tube ends. At each end of the platen the collars are held in coaxial series alignment, with spacer shims 26 interposed therebetween to establish the desired intertube spacing, by suitable means such as the bolts 28 extending through aligned apertures in the inwardly directed flanges of the adjacent halves of successive annular collars 22a, and by brazing the collars together to form a pressure-tight structure. Bellows-type expansion couplings 30 are brazed to the respective end gaskets of the series and are in turn secured to fittings 32 by which the resultant headers are connected to the heat exchange fluid lines 34. As indicated, the materials used in the headers are the same thin-walled materials as those used in the tubes 22 with respect to coefficient of thermal expansion, at least, so that, as the total platen assembly including the end headers contracts and expands with temperature change, all parts will tend to undergo the same change of dimensions and there will be no undue stresses in the composite platen structure. Lagging 36 is provided on the headers to conserve heat, and a suitable bed of lagging material 40 is provided beneath the platen for the same purpose, such bed resting upon the machine frame 42 which may be of any appropriate design. Suitable external piping connections and control valve arrangements in the line 34 provide for delivery and removal of steam or other heating fluid, and for regulation of platen temperatures, as well as for delivery and removal of water or other coolant for purposes of the described method.

The cover or blanket platen 12 comprises a sheet of neoprene 12a or other suitable flexible membrane material capable of withstanding the operating conditions of the press and having the requisite strength and sealing properties. This flexible membrane is mounted in a surrounding rectangular frame 44 which in turn is carried by elongated supports 46 and 48 mounted on sliders 50 and 52 adapted to move up and down in unison on the corner posts 54. These sliders are interconnected in pairs at the ends of the structure by cross bars 58 and 60 and are moved by a system of pulleys 62 and 64, cable 66 and 68 and a drive shaft 70 adapted to be turned in either direction selectievly the motor unit 72. The details of this part of the apparatus are of secondary concern and any suitable means for raising and lowering the upper platen may be employed so as to make it convenient to insert and remove layers of material between successive operations of the press.

The upper platen frame structure comprises a downwardly opening channel member 74 to the upper side of which the edge of the neoprene membrane 12a is sealingly clamped by means of the clamp plates 76 and clamp bolts and nuts 78 as shown. An outer-edge compressible seal of elastic material, designated 80, is bolted to the underside of the channel member 74 along its outer edge by the bolts 82. This sealing member 80 contacts the lower platen face to form a vacuum-tight seal therewith when the frame is pressed downwardly against the lower platen. A flexible rubber hold-down flange 84 is clamped against the lower face of the channel member 74 along its inner edge and projects inwardly toward the membrane 12a to act as a hold-down which clamps the protruding edges of the fabric and caul layers against the surface of the bottom press platen 10 and holds them in place, but without preventing free communication from the open interior of the frame channel 44 into the interior of the space between the two platens. Suction pipes 86 extend from the frame channel interior to a suitable source of vacuum (not shown). The channel interior extends continuously around the entire upper platen and thereby serves to distribute the negative pressure uniformly around the entire periphery of such platen so that all parts of the work material in the press are subjected to the negative pressure as desired.

In using such a press, the projecting edges of the bleeder cloth layers 14 and 20 are caused to extend beneath the inner hold-down or sealing flange 84 of the upper platen vacuum frame, whereas the porous metal caul plate 16 may or may not do so.

Other aspects of the invention will be evident to those skilled in the art, on the basis of the foregoing disclosure of the preferred mode of practicing the same.

I claim as my invention:

1. In a heat exchange press, a platen device comprising a plurality of thin-walled metal heat exchange tubes arranged in spaced parallel series relationship, means to pass heat exchange fluid through said tubes for changing the temperature thereof, a flat thermally conductive metal sheet placed in unbonded contact with the series of tubes on one face thereof to form a platen working surface, means joined to said metal sheet to form, in conjunction therewith, a vacuum envelope surrounding said series of tubes, and means operatively associated with said envelope to apply negative pressure thereto in order to draw said sheet firmly into heat exchange contact with said tubes.

2. The press defined in claim 1, and a lubricant interposed between the sheet and the adjacent tube surfaces, to facilitate relative sliding therebetween under differential thermal expansion of the sheet and tubes.

3. In a vacuum press, a first press platen comprising a heat transfer backing structure comprising a series of heat exchange ducts, and a thermally conductive facing sheet superimposed on said series of ducts in sliding contact therewith to define the working face of said platen, and opposing platen comprising a flexible blanket sheet, sealing means extending around the platen sheets marginally and forming a vacuum seal between the sheets, and means connected with said sealing means to draw a partial vacuum between the sheets.

4. The combination defined in claim 3, and means including said thermally conductive sheet forming a vacuum chamber including said ducts, and means to draw a partial vacuum in said vacuum chamber, thereby to maintain the thermally conductive sheet in intimate heat transfer sliding contact with said ducts.

5. The combination defined in claim 4, and headers commonly connected to the ducts respectively at opposite ends thereof to conduct heat exchange fluid to and from the ducts, the sealing means comprising a rigid channel connected marginally to the blanket sheet and opening toward the opposing platen, and a flexible sealing strip projecting outwardly from the channel to make sealing contact with the opposing platen.

References Cited

UNITED STATES PATENTS

| | | | |
|---|---|---|---|
| 1,782,852 | 11/1930 | Jeffray | 100—90 |
| 1,914,392 | 6/1933 | Worrall | 100—90 |
| 2,863,491 | 12/1958 | Adams | 100—93 XR |

PETER FELDMAN, Primary Examiner

U.S. Cl. X.R.

100—90; 156—285, 583